US012051156B2

(12) United States Patent
Barasofsky et al.

(10) Patent No.: US 12,051,156 B2
(45) Date of Patent: *Jul. 30, 2024

(54) SYSTEM AND METHOD FOR LINKING A SEGMENTATION GRAPH TO VOLUMETRIC DATA

(71) Applicant: Covidien LP, Mansfield, MA (US)

(72) Inventors: Ofer Barasofsky, Tel Mond (IL); Irina Shevlev, Ashdod (IL); Ariel Birenbaum, Raanana (IL); Guy Alexandroni, Yehud-Monosson (IL)

(73) Assignee: Covidien LP, Mansfield, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/847,422

(22) Filed: Jun. 23, 2022

(65) Prior Publication Data

US 2022/0335690 A1 Oct. 20, 2022

Related U.S. Application Data

(63) Continuation of application No. 17/108,843, filed on Dec. 1, 2020, now Pat. No. 11,380,060.
(Continued)

(51) Int. Cl.
*G06T 17/20* (2006.01)
*G06T 7/11* (2017.01)
*G06T 19/20* (2011.01)

(52) U.S. Cl.
CPC ............... *G06T 17/20* (2013.01); *G06T 7/11* (2017.01); *G06T 19/20* (2013.01);
(Continued)

(58) Field of Classification Search
CPC . G06T 17/20; G06T 7/11; G06T 19/20; G06T 2200/24; G06T 2207/10081;
(Continued)

(56) References Cited

U.S. PATENT DOCUMENTS 8,335,359 B2 12/2012 Fidrich et al.
8,706,184 B2 4/2014 Mohr et al.
(Continued)

FOREIGN PATENT DOCUMENTS

BR 0013237 A 7/2003
BR 0116004 A 6/2004
(Continued)

OTHER PUBLICATIONS

Charbonnier Jean-Paul et al: "Automatic Pulmonary Artery-Vein Separation and Classification in Computed Tomography Using Tree Partitioning and Peripheral Vessel Matching", IEEE Transactions on Medical Imaging, IEEE Service Center, Piscataway, NJ, US, vol. 35, No. 3, Mar. 1, 2016 (Mar. 1, 2016), pp. 882-892.
(Continued)

*Primary Examiner* — Sing-Wai Wu
(74) *Attorney, Agent, or Firm* — Weber Rosselli & Cannon LLP

(57) ABSTRACT

A system and method of image processing including a processor in communication with a display and a computer readable recording medium having instructions executed by the processor to read an image data set from the memory, segment the image data set, and skeletonize the segmented image data set. The instructions cause the processor to graph the skeletonized image data set, assign a branch identification (ID) for each branch in the graph, and associate each voxel of the segmented image data set with a branch ID. The instructions cause the processor to generate a three-dimensional (3D) mesh model from the graphed skeletonized image data set, associate each vertex of the 3D mesh model with a branch ID; and display in a user interface the 3D mesh model, and an image of the image data set.

20 Claims, 8 Drawing Sheets

Related U.S. Application Data

(60) Provisional application No. 62/965,288, filed on Jan. 24, 2020.

(52) U.S. Cl.
CPC ............ *G06T 2200/24* (2013.01); *G06T 2207/10081* (2013.01); *G06T 2207/30061* (2013.01); *G06T 2207/30101* (2013.01); *G06T 2219/2012* (2013.01)

(58) Field of Classification Search
CPC . G06T 2207/30061; G06T 2207/30101; G06T 2219/2012
See application file for complete search history.

(56) References Cited

U.S. PATENT DOCUMENTS

| | | | |
|---|---|---|---|
| 8,827,934 | B2 | 9/2014 | Chopra et al. |
| 9,918,659 | B2 | 3/2018 | Chopra et al. |
| 10,373,719 | B2 | 8/2019 | Soper et al. |
| 10,376,178 | B2 | 8/2019 | Chopra |
| 10,405,753 | B2 | 9/2019 | Sorger |
| 10,478,162 | B2 | 11/2019 | Barbagli et al. |
| 10,480,926 | B2 | 11/2019 | Froggatt et al. |
| 10,524,866 | B2 | 1/2020 | Srinivasan et al. |
| 10,555,788 | B2 | 2/2020 | Panescu et al. |
| 10,610,306 | B2 | 4/2020 | Chopra |
| 10,638,953 | B2 | 5/2020 | Duindam et al. |
| 10,674,970 | B2 | 6/2020 | Averbuch et al. |
| 10,682,070 | B2 | 6/2020 | Duindam |
| 10,706,543 | B2 | 7/2020 | Donhowe et al. |
| 10,709,506 | B2 | 7/2020 | Coste-Maniere et al. |
| 10,772,485 | B2 | 9/2020 | Schlesinger et al. |
| 10,796,432 | B2 | 10/2020 | Mintz et al. |
| 10,823,627 | B2 | 11/2020 | Sanborn et al. |
| 10,827,913 | B2 | 11/2020 | Ummalaneni et al. |
| 10,835,153 | B2 | 11/2020 | Rafii-Tari et al. |
| 10,885,630 | B2 | 1/2021 | Li et al. |
| 2003/0013972 | A1 | 1/2003 | Makin |
| 2003/0016850 | A1 | 1/2003 | Kaufman et al. |
| 2013/0303945 | A1 | 11/2013 | Blumenkranz et al. |
| 2014/0035798 | A1 | 2/2014 | Kawada et al. |
| 2015/0148690 | A1 | 5/2015 | Chopra et al. |
| 2015/0265368 | A1 | 9/2015 | Chopra et al. |
| 2016/0157939 | A1 | 6/2016 | Arkin et al. |
| 2016/0183841 | A1 | 6/2016 | Duindam et al. |
| 2016/0192860 | A1 | 7/2016 | Allenby et al. |
| 2016/0287344 | A1 | 10/2016 | Donhowe et al. |
| 2017/0024492 | A1* | 1/2017 | Kim ............ G06T 17/00 |
| 2017/0112576 | A1 | 4/2017 | Coste-Maniere et al. |
| 2017/0209071 | A1 | 7/2017 | Zhao et al. |
| 2017/0265952 | A1 | 9/2017 | Donhowe et al. |
| 2017/0311844 | A1 | 11/2017 | Zhao et al. |
| 2017/0319165 | A1 | 11/2017 | Averbuch |
| 2018/0078318 | A1 | 3/2018 | Barbagli et al. |
| 2018/0153621 | A1 | 6/2018 | Duindam et al. |
| 2018/0235709 | A1 | 8/2018 | Donhowe et al. |
| 2018/0240237 | A1 | 8/2018 | Donhowe et al. |
| 2018/0256262 | A1 | 9/2018 | Duindam et al. |
| 2018/0263706 | A1 | 9/2018 | Averbuch |
| 2018/0279852 | A1 | 10/2018 | Rafii-Tari et al. |
| 2018/0325419 | A1 | 11/2018 | Zhao et al. |
| 2019/0000559 | A1 | 1/2019 | Berman et al. |
| 2019/0000560 | A1 | 1/2019 | Berman et al. |
| 2019/0008413 | A1 | 1/2019 | Duindam et al. |
| 2019/0038365 | A1 | 2/2019 | Soper et al. |
| 2019/0065209 | A1 | 2/2019 | Mishra et al. |
| 2019/0110839 | A1 | 4/2019 | Rafii-Tari et al. |
| 2019/0175062 | A1 | 6/2019 | Rafii-Tari et al. |
| 2019/0183318 | A1 | 6/2019 | Froggatt et al. |
| 2019/0183585 | A1 | 6/2019 | Rafii-Tari et al. |
| 2019/0183587 | A1 | 6/2019 | Rafii-Tari et al. |
| 2019/0192234 | A1 | 6/2019 | Gadda et al. |
| 2019/0209016 | A1 | 7/2019 | Herzlinger et al. |
| 2019/0209043 | A1 | 7/2019 | Zhao et al. |
| 2019/0216548 | A1 | 7/2019 | Ummalaneni |
| 2019/0239723 | A1 | 8/2019 | Duindam et al. |
| 2019/0239831 | A1 | 8/2019 | Chopra |
| 2019/0250050 | A1 | 8/2019 | Sanborn et al. |
| 2019/0254649 | A1 | 8/2019 | Walters et al. |
| 2019/0269470 | A1 | 9/2019 | Barbagli et al. |
| 2019/0272634 | A1 | 9/2019 | Li et al. |
| 2019/0298160 | A1 | 10/2019 | Ummalaneni et al. |
| 2019/0298451 | A1 | 10/2019 | Wong et al. |
| 2019/0320878 | A1 | 10/2019 | Duindam et al. |
| 2019/0320937 | A1 | 10/2019 | Duindam et al. |
| 2019/0336238 | A1 | 11/2019 | Yu et al. |
| 2019/0343424 | A1 | 11/2019 | Blumenkranz et al. |
| 2019/0350659 | A1 | 11/2019 | Wang et al. |
| 2019/0365199 | A1 | 12/2019 | Zhao et al. |
| 2019/0365479 | A1 | 12/2019 | Rafii-Tari |
| 2019/0365486 | A1 | 12/2019 | Srinivasan et al. |
| 2019/0380787 | A1 | 12/2019 | Ye et al. |
| 2020/0000319 | A1 | 1/2020 | Saadat et al. |
| 2020/0000526 | A1 | 1/2020 | Zhao |
| 2020/0008655 | A1 | 1/2020 | Schlesinger et al. |
| 2020/0030044 | A1 | 1/2020 | Wang et al. |
| 2020/0030461 | A1 | 1/2020 | Sorger |
| 2020/0038750 | A1 | 2/2020 | Kojima |
| 2020/0043207 | A1 | 2/2020 | Lo et al. |
| 2020/0046431 | A1 | 2/2020 | Soper et al. |
| 2020/0046436 | A1 | 2/2020 | Tzeisler et al. |
| 2020/0054399 | A1 | 2/2020 | Duindam et al. |
| 2020/0060771 | A1 | 2/2020 | Lo et al. |
| 2020/0069192 | A1 | 3/2020 | Sanborn et al. |
| 2020/0077870 | A1 | 3/2020 | Dicarlo et al. |
| 2020/0078095 | A1 | 3/2020 | Chopra et al. |
| 2020/0078103 | A1 | 3/2020 | Duindam et al. |
| 2020/0085514 | A1 | 3/2020 | Blumenkranz |
| 2020/0109124 | A1 | 4/2020 | Pomper et al. |
| 2020/0129045 | A1 | 4/2020 | Prisco |
| 2020/0129239 | A1 | 4/2020 | Bianchi et al. |
| 2020/0138515 | A1 | 5/2020 | Wong |
| 2020/0155116 | A1 | 5/2020 | Donhowe et al. |
| 2020/0170623 | A1 | 6/2020 | Averbuch |
| 2020/0170720 | A1 | 6/2020 | Ummalaneni |
| 2020/0179058 | A1 | 6/2020 | Barbagli et al. |
| 2020/0188038 | A1 | 6/2020 | Donhowe et al. |
| 2020/0205903 | A1 | 7/2020 | Srinivasan et al. |
| 2020/0205904 | A1 | 7/2020 | Chopra |
| 2020/0214664 | A1 | 7/2020 | Zhao et al. |
| 2020/0229679 | A1 | 7/2020 | Zhao et al. |
| 2020/0242767 | A1 | 7/2020 | Zhao et al. |
| 2020/0275860 | A1 | 9/2020 | Duindam |
| 2020/0297442 | A1 | 9/2020 | Adebar et al. |
| 2020/0315554 | A1 | 10/2020 | Averbuch et al. |
| 2020/0330795 | A1 | 10/2020 | Sawant et al. |
| 2020/0352427 | A1 | 11/2020 | Deyanov |
| 2020/0364865 | A1 | 11/2020 | Donhowe et al. |

FOREIGN PATENT DOCUMENTS

| | | |
|---|---|---|
| CZ | 486540 B1 | 9/2016 |
| CZ | 2709512 B6 | 8/2017 |
| CZ | 2884879 B1 | 1/2020 |
| EP | 3413830 A4 | 9/2019 |
| EP | 3478161 A4 | 2/2020 |
| EP | 3641686 A2 | 4/2020 |
| EP | 3644885 A1 | 5/2020 |
| EP | 3644886 A1 | 5/2020 |
| MX | PA03005028 A | 1/2004 |
| MX | 225663 B | 1/2005 |
| MX | 226292 B | 2/2005 |
| MX | 246862 B | 6/2007 |
| MX | 265247 B | 3/2009 |
| MX | 284569 B | 3/2011 |

OTHER PUBLICATIONS

Extended European Search Report issued in European Patent Application No. 21152481.4 dated Jun. 2, 2021, 13 pages.

(56) References Cited

OTHER PUBLICATIONS

Kensaku Mori et al: "A fast rendering method using the tree structure of objects in virtualized bronchus endoscope system", Sep. 22, 1996 (Sep. 22, 1996), Visualization in Biomedical Computing : 4th International Conference, VBC' 96, Hamburg, Germany, Sep. 22-25, 1996, Springer, DE, pp. 33-42.
Khan Kashif Ali et al: "Navigational Bronchoscopy for Early Lung Cancer: A Road to Therapy", Advances in Therapy, Health Communications, Metuchen, NJ, US, vol. 33, No. 4, Mar. 22, 2016 (Mar. 22, 2016), pp. 580-596.
Palagyi K. et al: "Quantitative analysis of pulmonary airway tree structures", Computers in Biology and Medicine, New York, NY, US, vol. 36, No. 9, Sep. 1, 2006 (Sep. 1, 2006), pp. 974-996.

\* cited by examiner

SYSTEM AND METHOD FOR LINKING A SEGMENTATION GRAPH TO VOLUMETRIC DATA

CROSS-REFERENCE TO RELATED APPLICATIONS

This application is a continuation of U.S. patent application Ser. No. 17/108,843, filed on Dec. 1, 2020, which claims the benefit of and priority to U.S. Provisional Patent Application Ser. No. 62/965,288, filed on Jan. 24, 2020, the entire content of each of which is hereby incorporated by reference herein.

FIELD

This disclosure relates to image processing systems and methods to improve 3D segmentation and anatomy classification. In particular the disclosure is directed at improved techniques and method of identifying structures within computed tomography (CT) images and three-dimensional (3D) models derived therefrom, to improve surgical or treatment planning.

BACKGROUND

In many domains there's a need for segmenting and/or classifying voxels in a volumetric data. In terms of medical imaging, there are many open source and proprietary systems that enable manual segmentation and/or classification of medical images such as CT images. These systems typically require a clinician or a technician in support of a clinician to manually review the CT images and to effectively paint in the blood vessels or other structures manually, sometimes pixel by pixel. The user normally must scroll through many 2D slices and mark many pixels in order to obtain an accurate 3D segmentation/classification. As can be appreciated, such manual efforts are tedious and time-consuming rendering such methods very difficult to utilize for any type of surgical planning.

SUMMARY

One aspect of the disclosure is directed to a method of image processing including: acquiring a computed tomography (CT) image data set of the lungs; segmenting the CT image data set to identify airways and/or blood vessels in the CT image data set; skeletonizing the segmented CT image data by identifying the center points of the airways and/or blood vessels and forming a skeleton; graphing the skeleton to identify branches of the skeleton; assigning a branch identification (ID) to each branch of the skeleton; associate each voxel of the segmented CT image data set with a branch ID, where the branch ID of the voxel is the same as the branch ID of the closest center point. The method of image processing also includes generating a three-dimensional (3D) mesh model from the graph of the skeleton. The method of image processing also includes associating each vertex of the 3D mesh model with a branch id, and displaying in a user interface the 3D mesh model and a slice image from the image data set, where portions of the 3D mesh model that appear in slice image are highlighted. Other embodiments of this aspect include corresponding computer systems, apparatus, and computer programs recorded on one or more computer storage devices, each configured to perform the actions of the methods and systems described herein.

A further aspect of the disclosure is directed to a method of image processing including: segmenting an image data set, skeletonizing the segmented image data set, graphing the skeletonized image data set, assigning a branch identification (ID) for each branch in the graph, associate each voxel of the segmented image data set with a branch id. The method of image processing also includes generating a three-dimensional (3D) mesh model from the graphed skeletonized image data set; and associating each vertex of the 3D mesh model with a branch ID. Other embodiments of this aspect include corresponding computer systems, apparatus, and computer programs recorded on one or more computer storage devices, each configured to perform the actions of the methods and systems described herein.

Implementations of this aspect of the disclosure may include one or more of the following features. The method where a plurality of vertices with the same branch ID form an object. The method where each pixel of the segmented image data set is associated with an object in the 3D mesh model based on their branch ID. The method further including presenting the 3D mesh model and the image data set on a user interface. The method where the image data set is presented on the user interface as a slice image of the image data set. The method where any portion of the slice image that corresponds to a portion of an object of the 3D mesh model is colored the same as the corresponding object. The method where the color of an object in the 3D mesh model may be changed upon receipt of an appropriate command. The method where change of color of the object results in a change in color of a corresponding portion of the image. The method where the slice images of the image data set are scrollable. The method further including receiving a selection of a pixel in the displayed image of the image data set. The method may also include determining if a branch ID is associated with the selected pixel. The method may also include highlighting all pixels in the displayed image having the same branch ID in a common color when the selected pixel is associated with a branch id. The method further including highlighting in the user interface an object of the 3D mesh model having the same branch ID as the selected pixel in the image data set. The method further including receiving a selection of an object in a displayed 3D mesh model; determining the branch ID of the object. The method may also include displaying all pixels in a displayed image of the image data set having the same branch ID as the selected branch in a common color. The method further including highlighting the object in the 3D mesh model in a contrasting color. The method further including defining a cluster ID for each branch. The method further including displaying all objects having a common cluster ID in a common color. The method where the cluster ID is based on a commonality of the objects of the cluster. The method where the commonality of the objects of the cluster is based on selecting the objects by the smallest angle of intersection between connected branches and objects. Implementations of the described techniques may include hardware, a method or process, or computer software on a computer-accessible medium, including software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions One aspect of the disclosure is directed to a system including: a processor in communication with a display, and a computer readable recording medium storing thereon instructions that when executed by the processor: read an image data set from the computer readable recording medium, segment the image data set, skeletonize the segmented image data set, graph the skeletonized image data set, assign a branch identification (ID) for each branch in the graph, associate each voxel of the segmented image data set with a branch ID, generate a three-dimensional (3D) mesh model from the graphed skeletonized image data set. The system also causes the processor to associate each vertex of the 3D mesh model with a branch ID. The system also includes display in a user interface the 3D mesh model and a slice image from the image data set, where portions of the 3D mesh model that appear in slice image are highlighted. Other embodiments of this aspect include corresponding computer systems, apparatus, and computer programs recorded on one or more computer storage devices, each configured to perform the actions of the methods and systems described herein.

Implementations of this aspect of the disclosure may include one or more of the following features. The system where the instructions that when executed by the processor: receive a selection of a pixel in the displayed slice image, determine if a branch ID is associated with the selected pixel, and highlight all pixels in the displayed image having the same branch ID in a common color when the selected pixel is associated with a branch ID, or receive a selection of an object in a displayed 3D mesh model, determine the branch ID of the object, and display all pixels in the slice image having the same branch ID as the selected branch in a common color. Implementations of the described techniques may include hardware, a method or process, or computer software on a computer-accessible medium, including software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

BRIEF DESCRIPTION OF THE DRAWINGS

Various exemplary embodiments are illustrated in the accompanying figures. It will be appreciated that for simplicity and clarity of the illustration, elements shown in the figures referenced below are not necessarily drawn to scale. Also, where considered appropriate, reference numerals may be repeated among the figures to indicate like, corresponding or analogous elements. The figures are listed below.

DETAILED DESCRIPTION

The disclosure is directed at improved techniques and method of identifying structures within CT images and 3D models derived therefrom. The improved identification of structures allows for additional analysis of the images and 3D models and enables accurate surgical or treatment planning.

Figure 1:
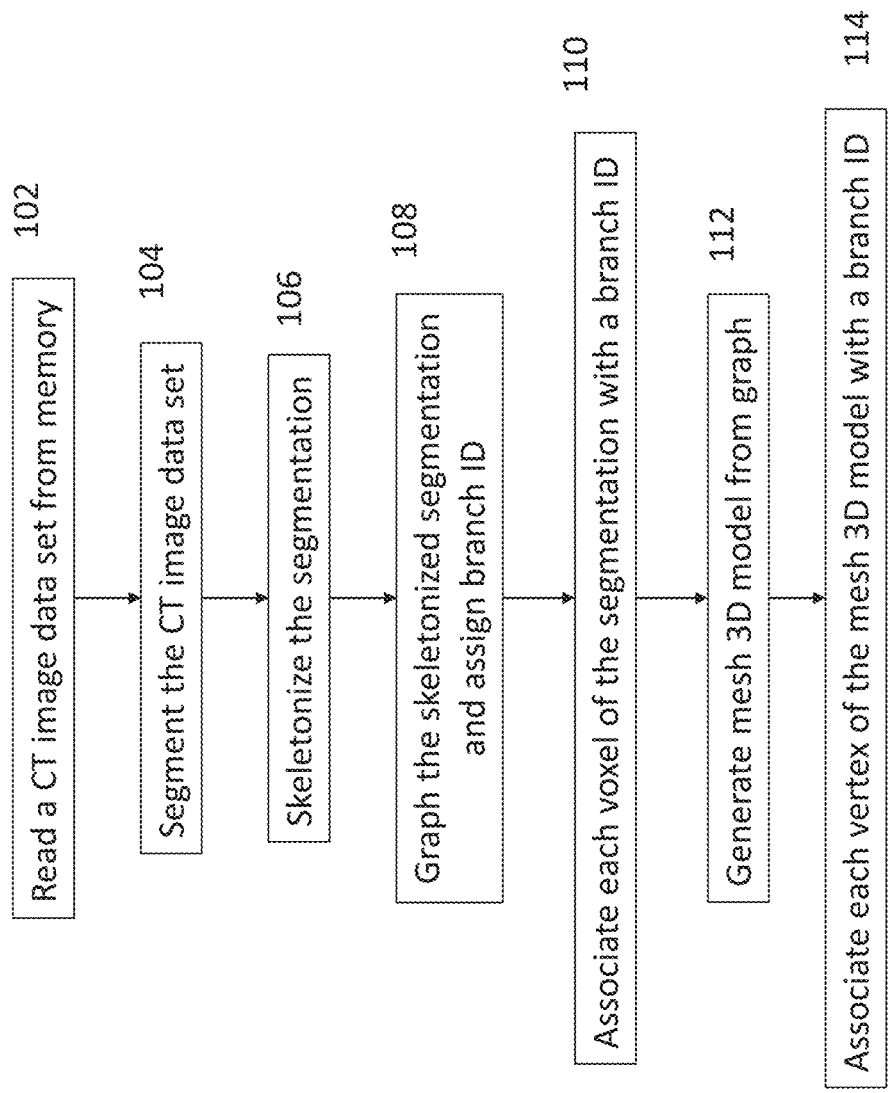
FIG. 1 is a flow chart describing an exemplary method of lining a segmentation graph to volumetric data in accordance with the disclosure.
Figure 2B:
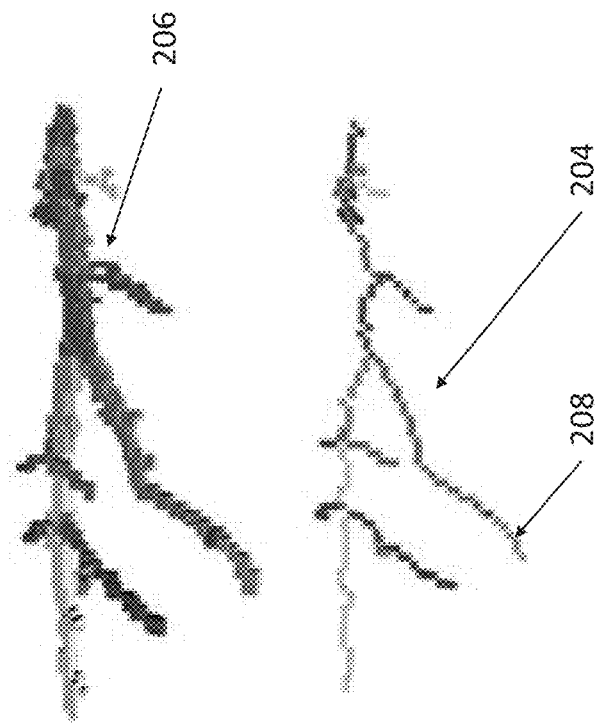
FIG. 2B depicts the transition from segmented volumetric data to the skeleton of the segmented volumetric data.
Figure 2A:
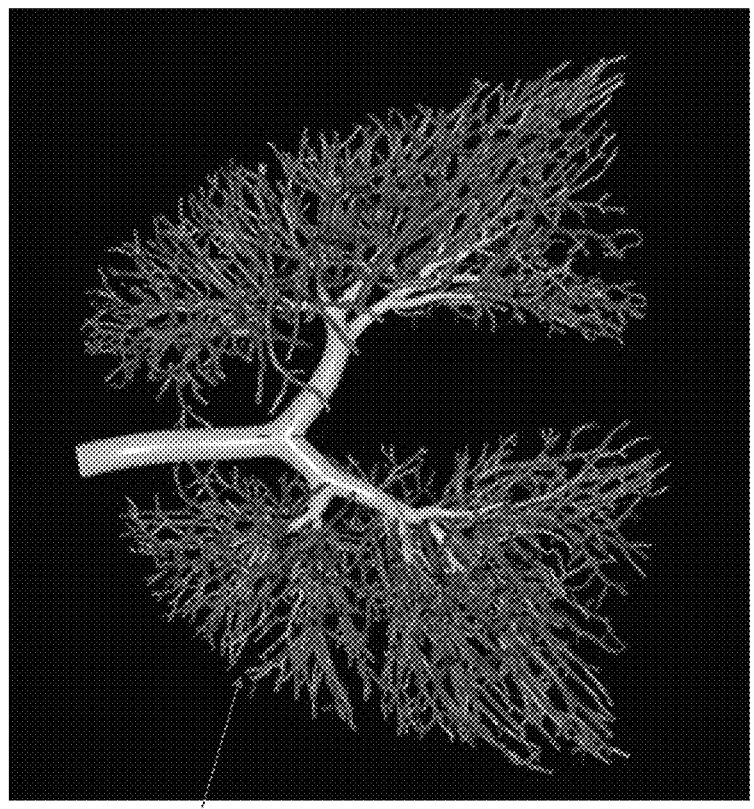
FIG. 2A depicts the result of segmentation of volumetric data in accordance with one aspect of the disclosure.

One aspect of the disclosure is described with respect to the steps outlined in FIG. 1. These steps may be implemented in executable code such as software and firmware or in hardware utilizing the components and systems of FIG. 8, below. As an initial step, a CT image data set is read from a memory storing the image data set at step 102 and one or more volumetric segmentation algorithms are applied at step 104 to the image data set. Segmentation can be employed to generate a 3D model of the anatomy of the CT image data set. In the case of the lungs, the result of volumetric segmentation can be a 3D model 202 as depicted in FIG. 2A. However, 3D model generation is not necessarily required for the method of the disclosure. What is required is the segmentation, which separates the images into separate objects. In the case of the segmentation of the lungs, the purpose of the segmentation is to separate the objects that make up the airways and the vasculature (e.g., the luminal structures) from the surrounding lung tissue.

Those of skill in the art will understand that while generally described in conjunction with CT image data, that is a series of slice images that make up a 3D volume, the instant disclosure is not so limited and may be implemented in a variety of imaging techniques including magnetic resonance imaging (MRI), fluoroscopy, X-Ray, ultrasound, positron emission tomography (PET), and other imaging techniques that generate 3D image volumes without departing from the scope of the disclosure. Further, those of skill in the art will recognize that a variety of different algorithms may be employed to segment the CT image data set including connected component, region growing, thresholding, clustering, watershed segmentation, edge detection, and others.

After the CT image data set is segmented (step 104), a skeleton is formed from the volumetric segmentation at step 106. A skeleton is a shape that represents the general form of an object. FIG. 2B depicts a skeleton 204 formed from a volumetric segmentation 206. The skeleton 204 is formed of a plurality of skeleton points 208 that identify the centerlines of the objects that comprise the segmented volume 206. There are a variety of techniques that can be employed for skeletonization of segmented volume 206 to define these skeleton points 208. For example, there are known a variety of methods skeleton computation techniques including topological thinning, shortest path determinations, and distance transformations from the object's boundaries. Any or multiple of these methods may be employed herein without departing from the scope of the disclosure.

Figure 2C:
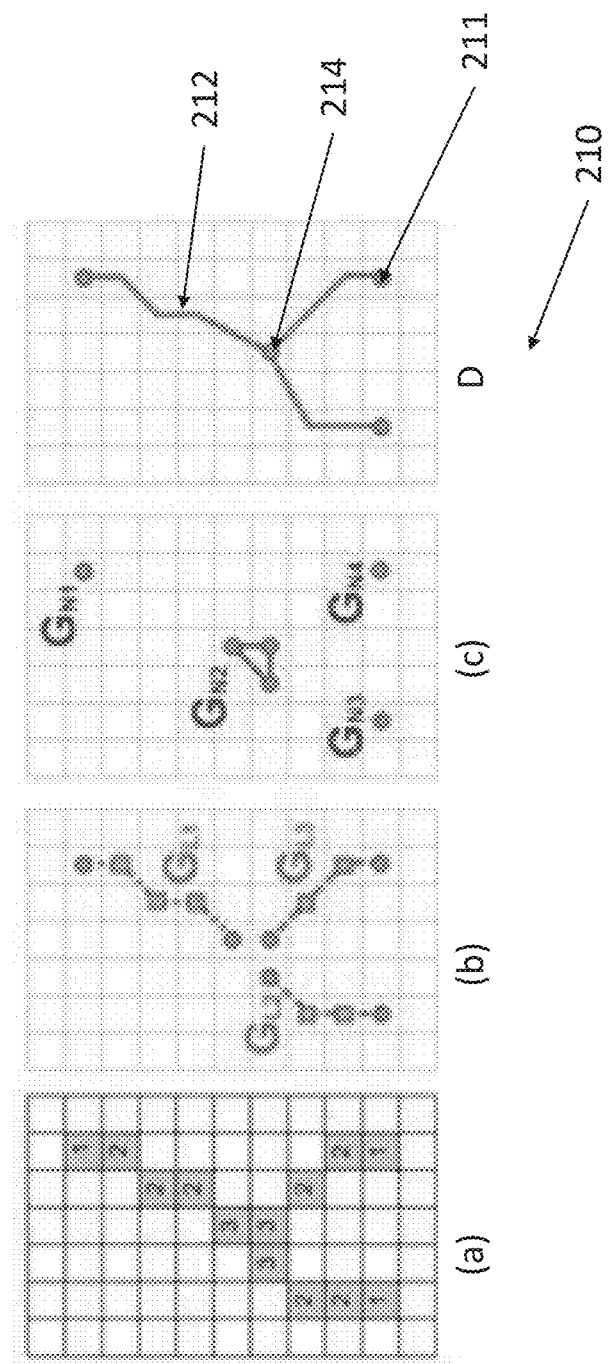
FIG. 2C depicts various methods of graphing a skeleton of FIG. 2B.

Following skeletonization a graph 210 is created at step 108 as shown in FIG. 2C. FIG. 2C is derived from Babin, Danilo, et al. "Skeletonization method for vessel delineation of arteriovenous malformation." *Computers in biology and medicine* 93 (2018): 93-105. A graph is a sequential object, where each successive component can be identified based on its relationship to its neighbors. In slide (a) of FIG. 2C there is shown a 2D graph of a skeleton. The numbers in each pixel of the graph represent the number of neighbors of that pixel. In 2D a neighborhood is defined as 3×3 pixels, thus each pixel has a neighborhood of 8 pixels. Those of skill in the art will recognize that in 3D a voxel (3D representation of a pixel) has a neighborhood 26 voxels around each individual voxel (e.g., a 3×3×3 matrix). Referring back to slide (a) of FIG. 2C the numbers in each pixel in slide (a) represent the number of pixels in the surrounding neighborhood which are also found in the skeleton derived at step 106. As shown in slide (a) a pixel with 1 in the graph has just a single neighbor and may be described as a leaf node 211 (e.g., end point of a branch). All of the pixels with 2 neighbors are considered part of a branch 212. All the pixels with 3 or more neighbors are nodes 214 from which extend multiple branches. Slide (b) depicts the pixels of the nodes 214 and leaf nodes 211 in orange circles on the graph and the pixels of the branches as green squares connected by dashed blue lines. Slide (c) removes the branches and depicts the location of the pixels of the leaf nodes $G_{N1}$, $G_{N3}$, $G_{N4}$, and a node $G_{N2}$. Each branch 212 must have a node or leaf node at its terminal ends. In slide (d) the node $G_{N2}$ is reduced to a single point 214, and the branches 212 are represented by a single continuous line. As part of graphing of the skeleton, each branch 214 is assigned an individual branch ID. Similarly, each node and leaf node is assigned an individual node ID. Both the branch ID and the node IDs and the branches associated with each node are stored in memory following the graphing step.

At step 110, each voxel of the volumetric segmentation is associated with a branch ID. The branch ID associated with each voxel is the branch ID of the closest skeleton point which is derived from the graphing process of step 210. In this way every voxel of the volumetric segmentation is assigned a branch ID.

Next at step 112, a 3D mesh is generated from the graph. A 3D mesh is the structural build of a 3D model consisting of polygons. 3D meshes use reference points, here the voxels identified in the graph, to define shapes with height, width and depth. There are a variety of different methods and algorithms for creating a 3D mesh, one such algorithm is the marching cubes algorithm. The result of the 3D mesh generation is again a 3D model, that is similar in outward appearance to a 3D model generated via segmentation techniques, see FIG. 3.

At step 114 each vertex (point of connection of the polygons) in the 3D mesh is then associated with a branch ID. The branch ID may be assigned by finding the closet skeleton point to the vertex. In this way every vertex of the 3D mesh is associated with a specific branch ID.

From the original volumetric segmentation at step 104, a variety of additional data related to each branch has also been developed including branch size (diameter), branch class, branch type (e.g., artery or vein), branch status and others. These data may be used to limit the data in the 3D mesh model and to perform other analytical steps as described herein. For example, the view of the 3D mesh model may be limited to only those vessels larger than a pre-defined diameter, e.g., >1 mm.

Figure 3:
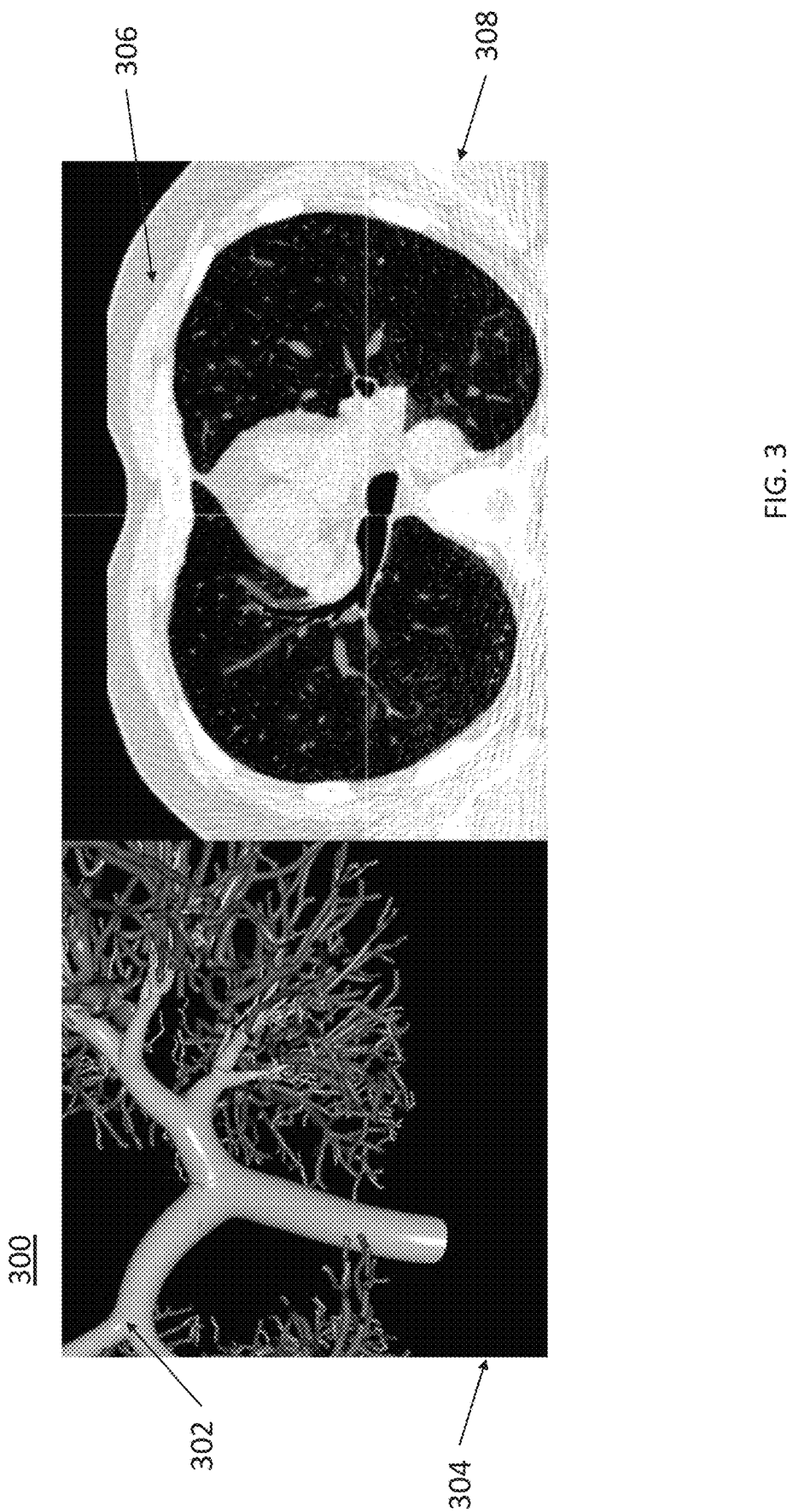
FIG. 3 is a user-interface implementing aspects of the result of the methods described in FIG. 1.

With each voxel and each vertex of the mesh associated with a specific branch ID a user interface (UI) 300 may be presented to a clinician such as seen in FIG. 3 where the 3D mesh model 302 is shown in a first pane 304 on one side of the UI and the CT images 306 from the CT image data set are shown in a second pane 308 on the second side of the UI. Because the 3D mesh model is derived from the CT image data set, the 3D mesh model is necessarily registered with the CT image data set. Accordingly, a number of options are available to the clinician in planning a surgical case or simply seeking to understand the patient's anatomy.

The 3D mesh model can now be overlaid the original image data set (e.g. the CT image data set). Because the 3D mesh model and the image data set are registered to one another by overlaying them, as a user scrolls through the images of the original image data set, portions of the 3D mesh model that align with that slice of the original image data set are revealed. By using different colors such as blue for veins and red for arteries the locations of these blood vessels can be seen in the image data set. The nature of the portions of the 3D mesh model (e.g., vein, airway or artery) may be determined using a variety of algorithms and techniques for determining their nature based on the physiology of the patient, the size and shape of the structure in question, and its connectedness to other components as well as other criteria known to those of skill in the art. As will further be appreciated other colors may be used for identifying aspects of the 3D mesh model and providing that information to a user via a user interface.

As shown in FIG. 3, the second pane 308 displays colored portions which correlate to the branches of the 3D mesh model 302 at their locations within the displayed CT image 306. The CT image 306 is often provided in scrollable form, thus by scrolling though successive CT images 306, the clinician can view branches as a continuum of color as the branch is depicted in each successive CT image 306. This provides an opportunity for a clinician to examine where branches (e.g., blood vessels) may be located proximate a lesion or other areas of interest in the CT images 306.

Figure 5:
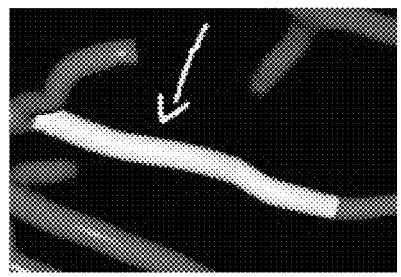
FIG. 5 is a focused portion of a user interface in accordance with the disclosure.
Figure 4:
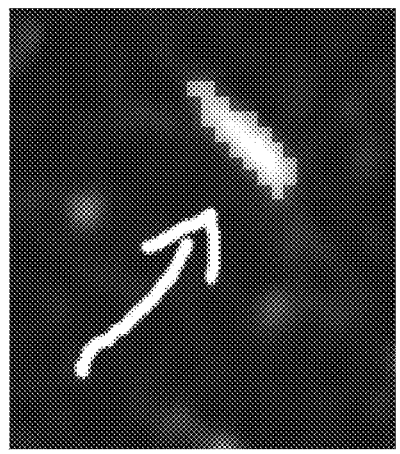
FIG. 4 is a focused portion of a user interface in accordance with the disclosure.

In one embodiment, the clinician can click on a branch in the 3D mesh model 302. The application driving the user interface 300 can then synchronize the second pane 308 such that the selected branch is visible in the displayed CT image 306. The CT image 306 may be centered to display the CT image 306 in which the closest skeleton point to the branch selected in 3D mesh model 302. The portions of the branch which are visible in that CT image 306 may be highlighted as depicted in FIG. 4. Further, in the 3D mesh model 302, the entirety of that branch 310 may be highlighted as shown in FIG. 5. The highlighting in the 3D mesh model 302 may be of a contrasting color from the rest of the 3D mesh model, and the highlighting in the CT image 306, may be of the same color as is chosen for the highlighting in the 3D mesh model 302.

Alternatively, the clinician, when scrolling through the CT images 306 in pane 308 may select a point in the CT image 306. If that point, a pixel, corresponds to a segmentation (e.g., an airway, an artery, or a vein, etc.) all of the voxels that belong to the same branch can be highlighted in both the CT image as shown in FIG. 4 and in the 3D mesh model 302, as shown in FIG. 5, for example using the same color or a common color to show they correspond to one another. Again, providing information to the clinician about the branch, the path it takes within the patient, and proximity to other structures.

Figure 6:
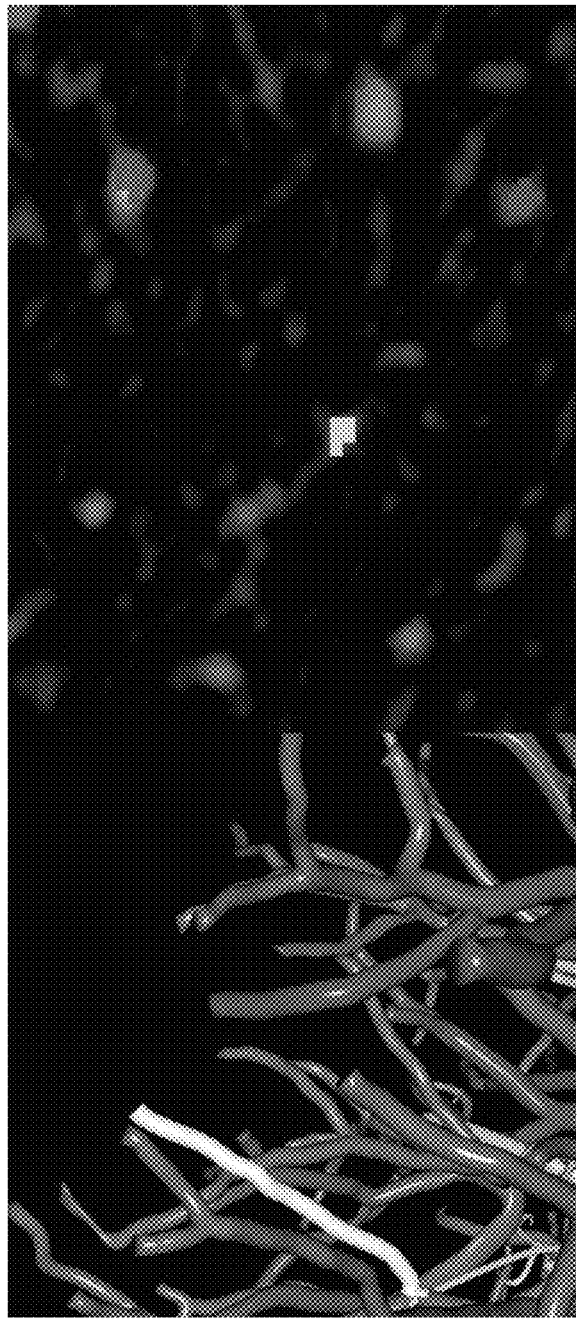
FIG. 6 is a further user-interface implementing aspects of the result of the methods described in FIG. 1.

In an alternative option depicted in FIG. 6, starting at the 3D mesh model, a clinician may select a branch in the 3D model. For example, the clinician may want to clearly understand where a particular branch appears in the CT image data set. Once selected, the clinician may change the branch's color for all voxels that have the same branch ID as the selected branch. The clinician may choose to change the color of the branch. As depicted on the right side of the UI in FIG. 6, the portions of the branch that are viewable in the particular slice of the CT image data set have their color changed as well. This allows the clinician to then scroll through the CT image data set and make an assessment of the branch.

Another aspect of the disclosure is the use of clustering of branches. In accordance with one aspect of the disclosure, the nature of the cluster may be selected or defined by a user via a user interface either with respect to the CT image data set or the 3D mesh model. In one example of clustering, a clinician may be interested in the blood vessels which feed or are in proximity to a tumor or lesion. While identifying the blood vessels that are visible within a small window or margin around the tumor may be useful, a better indication of blood flow and the related vasculature can be viewed when considering all of the blood vessels within the lobe of the lung where the tumor or lesion appears. By viewing all of the blood vessels (all branches) in a single lobe of the lung where the lesion or tumor is found, determinations can be made on how to proceed with the treatment, ordering of resection steps and determination of approximate locations of critical structures (e.g., arteries for clamping, suturing, or sealing) so that prior to the resection steps sufficient access is provided to manipulate tools. Further, particular complications related to the resection may be understood (e.g., proximity to the aorta, the heart, or other anatomical features) long before the surgery is attempted.

In this example, all of the branches which are considered a portion of the cluster (e.g., the lung lobe in question) are associated with a cluster ID. When clustering is utilized, in the example described above with respect to FIG. 3, following selecting a branch in the 3D mesh model 302, rather than centering the CT image 306 on the closest skeleton point to the pixel of the selected branch and only showing those portions of the segmentation with the same branch ID, all segments with the same cluster ID may be displayed (e.g., by depicting all the branches of the cluster in a common color).

Figure 7:
FIG. 7 is a focused portion of a user interface in accordance with the disclosure.

A further example of clustering can be useful in pathway generation as depicted in FIG. 7. When a branch is selected in the 3D mesh model 302 a geometric clustering constraint can be applied. These constraints may identify some commonality among the branches. For example, to determine a pathway from a selected point back towards the heart, the clustering constraint is to identify the connected branches to the selected branch which have the smallest angle between connected branches. As depicted in FIG. 7 if branch 702 were selected, the connected branches 704 and 706 would be considered part of the cluster, but branches 708 which intersects branch 702 at a greater angle than branch 704 would not be part of the cluster. In this same way, branch 710 intersects branch 704 at a greater angle than branch 706 and is thus excluded from the cluster. The application performing the clustering can iterate the angle analysis process and a cluster can be created from the selected branch 702 in the direction of the heart. This may provide the clinician information regarding the significance of the selected blood vessel or provide an alternative place for resection or some other clinical determination when planning a procedure that impacts the blood vessel in question. As will be appreciated, other criteria may be employed for the clustering either in conjunction with the angle of intersection or as an alternative to develop the desired cluster.

A further aspect of the disclosure relates to the use of neural networks or some other appropriate learning software or algorithm in connection with the methods described herein. Referring to the use of neural networks, a neural network must be trained. This is done by allowing the neural network to analyze images (e.g., from CT image data sets) in which the locations and identity of the vessels, airways, and structures are known and have been analyzed and annotated to depict the location of these structures in accordance with the methods described herein. Thus, the expedited and highly accurate analysis and identification of the blood vessels and airways provide a high-quality baseline to determine the efficacy and completeness of the neural network training.

During training of a neural network, a score is provided following each analysis of each frame by the neural network. Over time and training, the neural network becomes more adept at distinguishing the structures based on their size, changes in shape, location in the CT image data set, the interconnections, etc. The result is a segmented image data set where the distinctions between airways, blood vessels and other tissues can be identified and displayed without the need for manual marking and identification of the structures. There are a number of methods of training neural networks for use in the methods of the instant disclosure. As will be appreciated, in at least one embodiment, regardless of how robust the neural network becomes, a UI 300 may include a requesting the clinician confirm the analyzes of the neural network.

Example 1—Pulmonary Blood Vessel Classification

In order to help physicians plan the treatment, a pulmonary vasculature analysis tool has been developed for the analysis of CT images in which the following steps are performed. First segment the pulmonary vasculature from the patient CT. Next in order to simplify the representation the segmentation is skeletonized, and a graph is generated based on the skeleton. In the third step a deep learning classifier is employed to separate arteries and veins. The resulted classified segmentation is visualized to the user with the ability of editing.

Blood vessel classification relies on analyzing the local environment and by tracking the vessel origin. To achieve this, a convolutional neural network classifies each vessel independently based on its surrounding followed by a post processing algorithm that incorporates global knowledge to refine the classification.

The input to the neural network is a 3D patch extracted around the main axis of the vessel and the output is a probability of being artery or vein. The post processing includes tracking of anatomical pathways along vasculature and performing majority voting. The neural network has been trained and evaluated in a leave-one-out cross validation scheme on 10 fully annotated CTs scans from the CARVE dataset found at https://arteryvein.grand-challenge.org/.

The performance was measured using two methods. First an accuracy of individual vessel classification was calculated and resulted in an average result of 86%. In addition, the accuracy specifically on the segmental blood vessels was evaluated and the accuracy in this case was 87%. The tool developed achieves significant performance of the classification that can be even further improved by additional annotated training data or by a more accurate input skeletonization.

Example 2—Lung Blood Vessel Segmentation Using Deep Learning

Performing lung cancer therapy treatment such as nodule ablation or surgery requires a physician to study the patient anatomy, specifically the blood vessels that are in the vicinity of the lesion or the area of interest. For example, when performing a lobectomy, a surgeon is interested in blood vessels that enter and leave the specific lobe. Physicians usually look at a CT scan prior and use it to plan the therapeutic procedure.

A tool has been developed to automatically segment lung blood vessels using deep learning to assist a physician in visualizing and planning a therapeutic procedure in the lung. The suggested network architecture is a 3D fully convolutional neural network based on V-Net. (Milletari, Fausto, Nassir Navab, and Seyed-Ahmad Ahmadi. "V-net: Fully convolutional neural networks for volumetric medical image segmentation." 2016 *Fourth International Conference on 3D Vision* (3DV), IEEE, 2016). The network input are 3D CT patches with a size of 64×64×64 voxels and normalized for pixel spacing. The output is a corresponding blood vessel segmentation of the same size. The network was trained on 40 scans from the CARVE14 dataset, found at https://arteryvein.grand-challenge.org/, and was validated using 15 different scans from the same dataset.

The network achieved an average validation dice accuracy score of 0.922. The network was also compared to an existing rule-based algorithm. Visual inspection revealed that the network was far better than the rule-based algorithm and was even able to correct some mistakes in the ground truth. In terms of computational costs, the network was able to fully segment a new CT in an average time of ~15 seconds, while the classical algorithm average time was ~10 minutes. The neural network can be further trained to be more robust to pathologies and as a basis for a blood vessel classification network that distinguishes between arteries and veins.

Those of ordinary skill in the art will recognize that the methods and systems described herein may be embodied on one or more applications operable on a computer system (FIG. 8) for a variety of diagnostic and therapeutic purposes. As an initial matter, these systems and methods may be embodied on one or more educational or teaching applications. Further the methods and systems may be incorporated into a procedure planning system where structures, blood vessels, and other features found in the CT image data set are identified and a surgical or interventional path is planned to enable biopsy or therapy to be delivered at a desired location. Still further, these methods may be employed to model blood flow paths following surgery to ensure that tissues that are not to be resected or removed will still be sufficiently supplied with blood following the procedure. Of course, those of skill in the art will recognize that a variety of additional and complementary uses of the image processing methods described herein.

Figure 8:
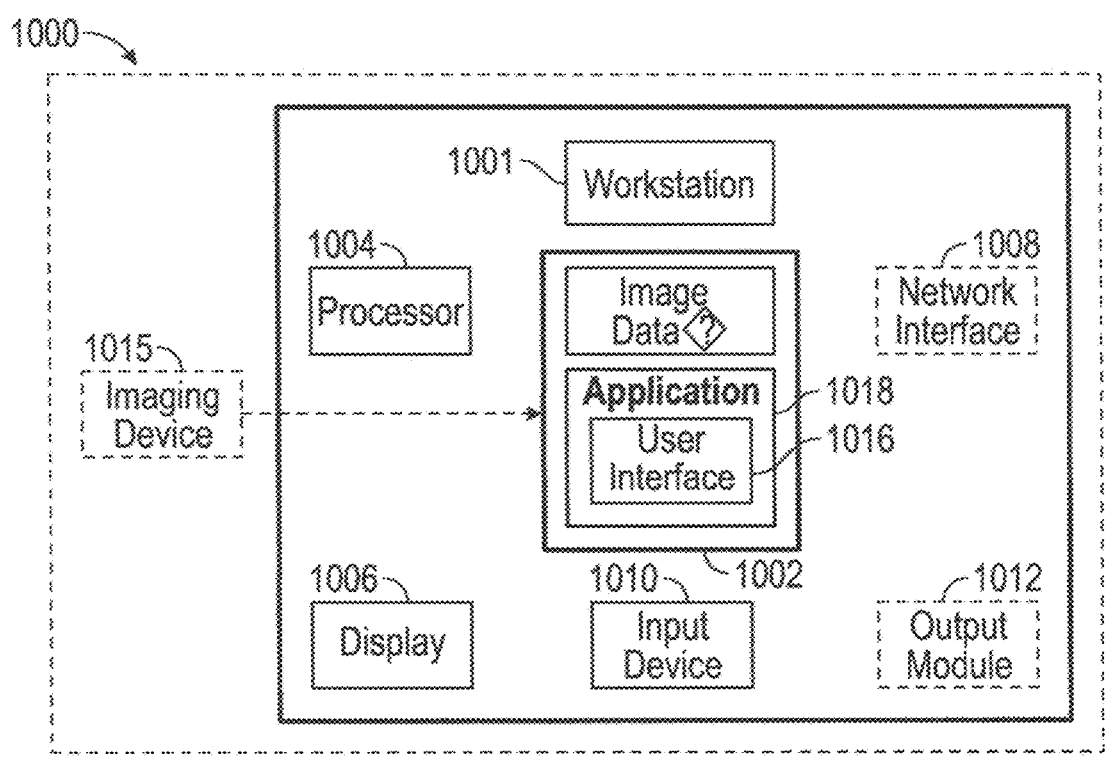
FIG. 8 is a schematic diagram of a computer system capable of executing the methods described herein.

Reference is now made to FIG. 8, which is a schematic diagram of a system 1000 configured for use with the methods of the disclosure including the methods of FIG. 1. System 1000 may include a workstation 1001. In some embodiments, workstation 1001 may be coupled with an imaging device 1015 such as a CT scanner or an MRI, directly or indirectly, e.g., by wireless communication. Workstation 1001 may include a memory 1002, a processor 1004, a display 1006 and an input device 1010. Processor or hardware processor 1004 may include one or more hardware processors. Workstation 1001 may optionally include an output module 1012 and a network interface 1008. Memory 1002 may store an application 1018 and image data 1014. Application 1018 may include instructions executable by processor 1004 for executing the methods of the disclosure including the method of FIG. 1.

Application 1018 may further include a user interface 1016. Image data 1014 may include image data sets such as CT image data sets and others useable herein. Processor 1004 may be coupled with memory 1002, display 1006, input device 1010, output module 1012, network interface 1008 and fluoroscope 1015. Workstation 1001 may be a stationary computing device, such as a personal computer, or a portable computing device such as a tablet computer. Workstation 1001 may embed a plurality of computer devices.

Memory 1002 may include any non-transitory computer-readable storage media for storing data and/or software including instructions that are executable by processor 1004 and which control the operation of workstation 1001 and, in some embodiments, may also control the operation of imaging device 1015. In an embodiment, memory 1002 may include one or more storage devices such as solid-state storage devices, e.g., flash memory chips. Alternatively, or in addition to the one or more solid-state storage devices, memory 1002 may include one or more mass storage devices connected to the processor 1004 through a mass storage controller (not shown) and a communications bus (not shown).

Although the description of computer-readable media contained herein refers to solid-state storage, it should be appreciated by those skilled in the art that computer-readable storage media can be any available media that can be accessed by the processor 1004. That is, computer readable storage media may include non-transitory, volatile and non-volatile, removable and non-removable media implemented in any method or technology for storage of information such as computer-readable instructions, data structures, program modules or other data. For example, computer-readable storage media may include RAM, ROM, EPROM, EEPROM, flash memory or other solid-state memory technology, CD-ROM, DVD, Blu-Ray or other optical storage, magnetic cassettes, magnetic tape, magnetic disk storage or other magnetic storage devices, or any other medium which may be used to store the desired information, and which may be accessed by workstation 1001.

Application 1018 may, when executed by processor 1004, cause display 1006 to present user interface 1016. User interface 1016 may be configured to present to the user a variety of images and models as described herein. User interface 1016 may be further configured to display and mark aspects of the images and 3D models in different colors depending on their purpose, function, importance, etc.

Network interface 1008 may be configured to connect to a network such as a local area network (LAN) consisting of a wired network and/or a wireless network, a wide area network (WAN), a wireless mobile network, a Bluetooth network, and/or the Internet. Network interface 1008 may be used to connect between workstation 1001 and imaging device 1015. Network interface 1008 may be also used to receive image data 1014. Input device 1010 may be any device by which a user may interact with workstation 1001, such as, for example, a mouse, keyboard, foot pedal, touch screen, and/or voice interface. Output module 1012 may include any connectivity port or bus, such as, for example, parallel ports, serial ports, universal serial busses (USB), or any other similar connectivity port known to those skilled in the art.

While several aspects of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular aspects.

What is claimed is:

1. A method of image processing, comprising:
generating a graph of a skeletonized image data set;
generating a three-dimensional (3D) mesh model from the graph of the skeletonized image data set; and
assigning a cluster identification (ID) to connected objects of the 3D mesh model defining an angle relative to one another that is less than or equal to a first angle, where connected objects of the 3D mesh model defining an angle relative to one another that is greater than the first angle are excluded from the cluster ID.

2. The method according to claim 1, further comprising a branch identification (ID) to each branch in the graph.

3. The method according to claim 2, further comprising forming an object, wherein a plurality of vertices with the same branch ID forms the object.

4. The method according to claim 3, further comprising associating each pixel of a computed tomography (CT) image data set with an object in the 3D mesh model based on their branch ID.

5. The method according to claim 4, further comprising presenting the 3D mesh model and the CT image data set on a user interface.

6. The method according to claim 5, wherein presenting the CT image data set includes presenting the CT image data set on the user interface as a slice image of the CT image data set.

7. The method according to claim 6, further comprising coloring any portion of the slice image data that corresponds to a portion of an object of the 3D mesh model the same color as the corresponding object.

8. The method according to claim 7, further comprising changing the color of any object in the 3D mesh model upon receipt of an appropriate command.

9. The method according to claim 8, wherein changing the color of any object includes changing a color of a color of a corresponding portion of the image as a result of a change in color of the object.

10. The method according to claim 9, wherein presenting the slice image of the CT image data set includes presenting scrollable slice images of the CT image data set on the user interface.

11. The method according to claim 4, further comprising:
receiving a selection of a pixel in a displayed image of the CT image data set;
determining if a branch ID is associated with the selected pixel; and
highlighting all pixels in the displayed image having the same branch ID in a common color when the selected pixel is associated with a branch ID.

12. The method according to claim 11, further comprising highlighting in a user interface an object of the 3D mesh model having the same branch ID as the selected pixel in the image data set.

13. The method according to claim 4, further comprising:
receiving a selection of an object in a displayed 3D mesh model;
determining the branch ID of the object; and
displaying all pixels in a displayed image of the CT image data set having the same branch ID as the selected branch in a common color.

14. The method according to claim 13, further comprising highlighting the object in the 3D mesh model in the contrasting color.

15. The method according to claim 3, further comprising defining a cluster ID for each branch.

16. The method according to claim 15, further comprising displaying all objects having a common cluster ID in a common color.

17. The method according to claim 16, wherein displaying all objects having a common cluster ID includes identifying the cluster ID based on a commonality of the objects of the cluster.

18. The method according to claim 17, wherein the commonality of the objects of the cluster ID is based on selecting the objects by the smallest angle of intersection between the connected branches and objects.

19. A system, comprising:
a display;
a computing device in communication with the display, the computing device having a processor and a memory storing instructions thereon which, when executed by the processor, cause the system to:
generate a graph of a skeletonized image data set;
generate a three-dimensional (3D) mesh model from the graph of the skeletonized image data set; and
assign a cluster identification (ID) to connected objects of the 3D mesh model defining an angle relative to one another that is less than or equal to a first angle, where connected objects of the 3D mesh model defining an angle relative to one another that is greater than the first angle are excluded from the cluster ID.

20. The system according to claim 19, wherein the memory further stores instructions thereon which, when executed by the processor, cause the system to:
assign a branch identification (ID) to each branch in the graph;
receive a selection of a pixel in a slice image from a CT image data set;
determine if a branch ID is associated with the selected pixel; and
highlight all pixels in the displayed slice image having the same branch ID in a common color when the selected pixel is associated with a branch ID, or assign a branch ID to each branch in the graph;
receive a selection of an object in the 3D mesh model;
determine the branch ID of the object; and
display all pixels in the slice image having the same branch ID as the selected branch in a common color.

* * * * *